United States Patent
Velusamy

(10) Patent No.: US 11,012,566 B1
(45) Date of Patent: May 18, 2021

(54) SIMULATED CUSTOMER APPLICATION EXPERIENCES FOR CUSTOMER SUPPORT VIA EMULATORS

(71) Applicant: T-Mobile USA, Inc., Bellevue, WA (US)

(72) Inventor: Senthil Kumar Mulluppadi Velusamy, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/683,693

(22) Filed: Nov. 14, 2019

(51) Int. Cl.
*H04M 3/51* (2006.01)
*H04L 9/32* (2006.01)
*H04L 29/08* (2006.01)

(52) U.S. Cl.
CPC ........ *H04M 3/5183* (2013.01); *H04L 9/3228* (2013.01); *H04L 67/34* (2013.01)

(58) Field of Classification Search
CPC ..... H04M 3/5183; H04L 67/34; H04L 9/3228
USPC ............... 379/265.09, 265.05, 265.03, 266.1
See application file for complete search history.

(56) References Cited

U.S. PATENT DOCUMENTS

| 2012/0322439 | A1* | 12/2012 | Ding | H04L 41/0654 455/425 |
| 2015/0169615 | A1* | 6/2015 | Batchu | G06F 16/25 707/624 |
| 2016/0242053 | A1* | 8/2016 | Leontiadis | H04W 24/10 |
| 2017/0116062 | A1* | 4/2017 | Kanodia | H04L 41/5074 |

\* cited by examiner

*Primary Examiner* — Thjuan K Addy
(74) *Attorney, Agent, or Firm* — Han Santos, PLLC

(57) ABSTRACT

A customer service representative troubleshoots a software application on a mobile subscriber's user device (e.g., a mobile phone) by receiving configuration and settings information of the software application on the user device and then running a copy or instance of the software application on an emulator or in an emulation environment that simulates the user device, using the configuration and settings information. The customer service representative can then communicate emulation results and recommendations for revised software application configuration settings to the mobile subscriber, for example via the user device. In example embodiments the software application instance on the emulator does not use personal or private data of the mobile subscriber, for example content data in the software application instance that is on the user device.

18 Claims, 3 Drawing Sheets

SIMULATED CUSTOMER APPLICATION EXPERIENCES FOR CUSTOMER SUPPORT VIA EMULATORS

BACKGROUND

In today's world mobile subscribers or users have user devices such as smart phones that can not only make telephone calls, but can also function as general purpose computing devices that run software applications and network with other computing devices, for example by enabling users to visit websites on the Internet and engage services through various software applications on the smart phones.

BRIEF DESCRIPTION OF THE DRAWINGS

The detailed description is described with reference to the accompanying figures. In the figures, the left-most digit(s) of a reference number identifies the figure in which the reference number first appears. The same reference numbers indicate similar or identical items.

DETAILED DESCRIPTION

Figure 1:
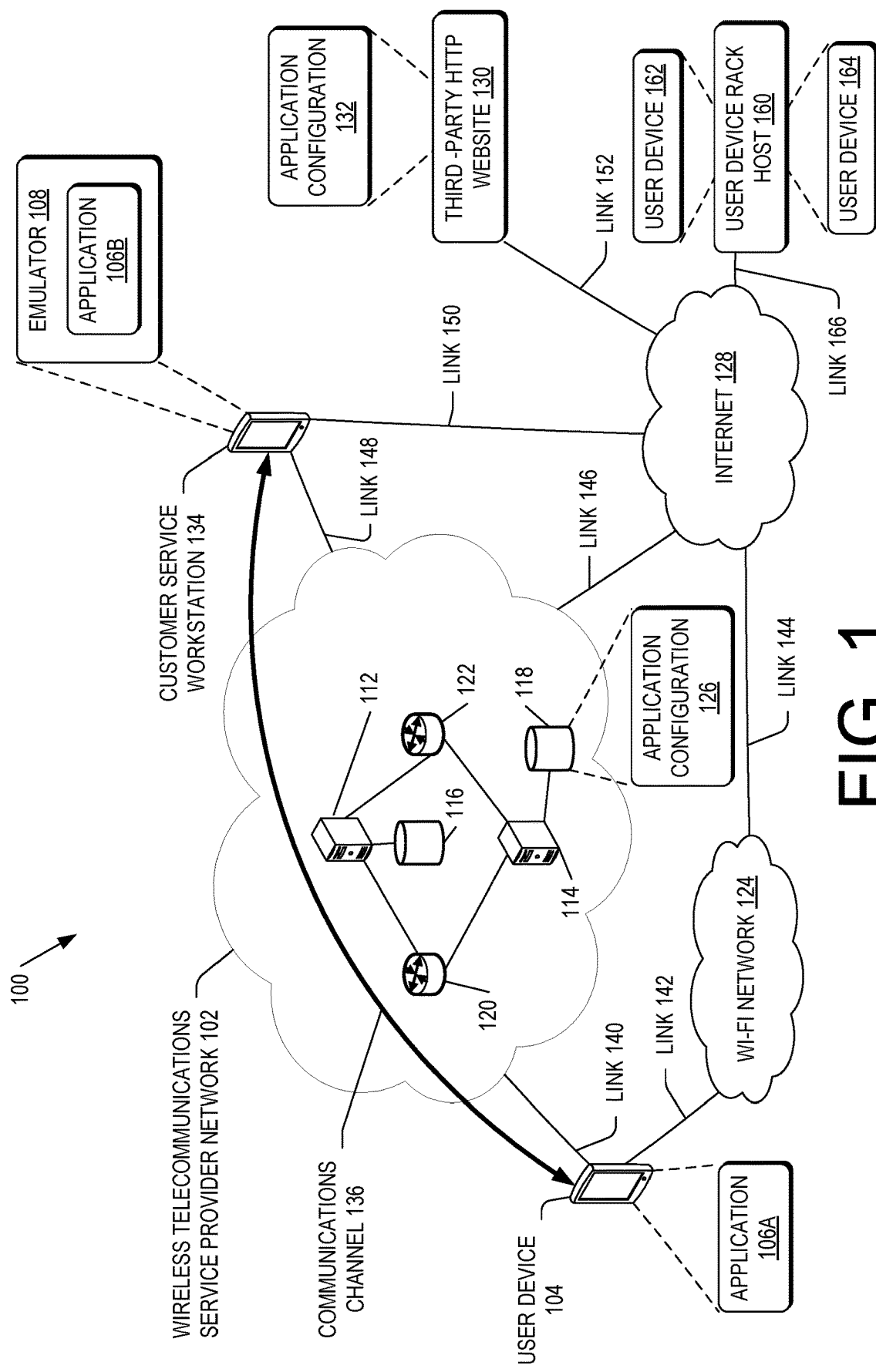
FIG. 1 shows an illustrative computing environment and network architecture for implementing techniques that enable entities such as customer service representatives to troubleshoot software problems encountered by mobile subscribers on their user devices such as mobile phones, by running copies of the software in question in an emulation environment using the same software configurations as on the user devices.

Wireless mobile telecommunications service providers often distribute various software applications to customers/users for use on their mobile phones, and a wireless mobile telecommunications service provider can assume responsibility for providing technical support to users such as mobile subscribers to help them sort out problems relating to those software applications. Screen sharing can be costly or unavailable on mobile phones, and many of the applications on a mobile subscriber's user device (mobile phone, tablet computer with a wireless data or wireless communications plan with the wireless telecommunications service provider, and so forth) can be significantly or extensively customized or configured by the user or mobile subscriber. Consequently, it can be challenging for customer care or customer service representatives to figure out through voice communications or text communications with customer users or mobile subscribers, how to solve problems that the customers are encountering with software applications on their user devices.

Accordingly, this disclosure is directed to systems and techniques for efficiently troubleshooting software problems encountered by mobile subscribers on their user devices such as mobile phones. In example embodiments an entity such as a customer service representative helps troubleshoot software applications on a mobile subscriber's user device (mobile phone, tablet computer with wireless communications capability, and so forth) by running copies of the software applications in question on an emulator or in an emulation environment (or in other words, on a virtual user device composed of software running within the emulator 108, that mimics physical hardware of the mobile subscriber's user device) using the same software configuration(s) as on the user device, or on another user device accessible to the customer service representative and having the same operating system and software application configuration and settings as the mobile subscriber's user device. The customer service representative observes the results, tests with different inputs and alternative configurations, and communicates results and recommendations to the mobile subscriber. In this way problems and scenarios that a mobile subscriber encounters can be replicated, and possible solutions or mitigations can be explored and tested, and then results and solutions can be shared with the mobile subscriber. For example, solutions might include recommendations for different configurations or settings of the software application, a different version of the software application, and/or different operating system configurations or settings and/or versions. In example embodiments, only information regarding the software in question and its configuration/settings, and optionally also relevant information regarding the environment in which the software is operating on the mobile subscriber's user device (e.g., the mobile subscriber's particular make, model and version of device, operating system version, and so forth), is shared with the customer service representative, and then used to configure a copy or instance of the software application(s) in question for running in an emulator or emulation environment (or in other words, for running on a virtual user device) that simulates the mobile subscriber's user device, or on another, comparable user device accessible to the customer service representative. Thus, the customer service representative can assist in troubleshooting without having to access personal or private data of the mobile subscriber or view operations on the mobile subscriber's user device. Effective troubleshooting assistance can be provided without exposing the user's data or requiring resource-intensive communications, for example, communications that allow the customer service representative to control and observe operations of the mobile subscriber's user device.

FIG. 1 shows an illustrative computing environment 100 and network architecture to support troubleshooting of software problems encountered by mobile subscribers on their user devices. By way of overview, FIG. 1 shows a mobile subscriber's user device 104 in communication with a customer service representative's customer service workstation 134 via a communications channel 136 through a wireless telecommunications service provider network 102. The network 102 can, for example, be administered by a wireless telecommunications service provider with which the mobile subscriber has an account or subscriber agreement for wireless and optionally additional services, or can be administered by a wireless telecommunications service provider through which the user device 104 is communicating via a roaming arrangement. The user device 104 is running and/or has stored thereon a software application 106A, and the customer service workstation 134 is running and/or has stored thereon a software application 106B in an emulation environment or emulator 108, with the configuration settings that are the same as, or that reflect, the configuration settings of the software application 106A on the user device 104. The emulation environment or emulator 108 can effectively create, support, and/or form a virtual user device that is composed of software that emulates or simulates physical hardware of the user device 104. The software application 106B is the same as, or another instance of, the software application 106A.

In example embodiments, the software applications 106A, 106B are identical in version/build, in any administrator configurations, and in user-configurable settings. In other example embodiments where there are some differences, for example the customer service workstation 134 has a different version or build of the software application, and/or the operating system in the emulation environment or virtual user device of the emulator 108 has or effectively represents a different operating system version, those differences can be noted in a report from the customer service representative or the customer service workstation 134 to the mobile subscriber or the user device 104 as part of the troubleshooting evaluation. In example embodiments, the customer service workstation 134 has access to different software application versions and/or operating systems/versions, and optionally selects one or several different combinations to evaluate (either as a default selection or based on other factors such as similarity to versions on the user device 104 and/or newest/most recent available), and optionally provides the mobile subscriber with opportunity to select one or several different combinations for evaluation and troubleshooting. In situations where the customer service workstation 134 doesn't know all configuration options in effect on the user device 104, including for example software and operating system versions, in example embodiments standard or default settings (e.g., administrative settings or corporate configurations) are selected and evaluated for and also noted in the resulting evaluation report, and input from the mobile subscriber to make, guide or confirm the selections is optionally solicited.

In example embodiments the customer service workstation 134 variously receives the software application 106B as a copy of the software application 106A from the user device 104, receives the software application 106B from the wireless telecommunications service provider network 102, receives the software application 106B from a library of a customer service entity with which the customer service representative is affiliated, and/or receives or obtains the software application 106B from a third party vendor, all in accordance with proper arrangements regarding licensing and ownership rights with respect to the software application(s) to be troubleshot. In example embodiments, similar arrangements are also made with respect to ancillary software that may be useful for the emulation such as an operating system of the user device.

Software application configuration and settings information can include one or more of the software application's version, administrative settings (e.g., configurations and settings that are put in place by an administrator that monitors software instances in use by multiple people or users in a group, such as a corporation or other organization, that in most circumstances the users cannot change without assistance or permission of the administrator), and various settings and configurations that a user can select to customize or configure the software application. For example, where software applications provide selectable configurations and settings, users can select among them to cause a software application to operate in a particular mode, in particular units (SAE, metric, etc.), present with customized action menus for the user to select various actions and operations, include a set of credentials or resource access codes (e.g., membership identifications and security codes), and so forth. In example embodiments, environmental information such as operating system version, operating system configuration, and/or model and physical configuration of the user device 104 are also provided to the customer service workstation 134 in the same or similar ways as the software application configuration and settings information is provided to the customer service workstation 134, to support creation of an emulation environment in the emulator 108.

As described in greater detail herein, the customer service workstation 134 can receive the configuration settings a) from the user device 104 (e.g., via the communications channel 136), b) from the wireless telecommunications service provider network 102 (e.g., a data store 118 within the network 102), or c) from an independent third-party such as a third-party HTTP (Hyper Text Transfer Protocol) website 130.

In particular, FIG. 1 shows the mobile subscriber's user device 104 (which can, for example, be a mobile phone or smart phone, a tablet computer with wireless telecommunication capability, or other computation device capable of running software applications) running the software application 106A. Although only one software application for the user device 104 is shown in FIG. 1 for the sake of simplicity, it will be understood that the user device 104 in many scenarios will be running or have stored thereon multiple software programs that can be troubleshot sequentially or simultaneously in accordance with embodiments and techniques variously described herein. The user device 104 connects via a link 140 with a wireless telecommunications service provider network 102, which in turn communicates with the customer service workstation 134 via a link 148 and with the Internet 128 via a link 146. The customer service workstation 134 can also communicate directly with the Internet 128 via a link 150. The third-party HTTP website 130 communicates with the Internet 128 via a link 152, and the user device 104 can communicate with the Internet 128 through a Wi-Fi network 124, via a link 142 between the user device 104 and the Wi-Fi network 124 and then a link 144 between the Wi-Fi network 124 and the Internet 128. As shown in FIG. 1, the third-party HTTP website 130 contains an application configuration 132 that is a copy of, or reflects, the software application settings or configuration of the software application 106A on the user device 104. Also shown in FIG. 1, the data store 118 within the wireless telecommunications service provider network 102 contains an application configuration 126 that is a copy of, or reflects, the software application settings or configuration of the software application 106A on the user device 104. The links 140, 142, 144, 146, 148, 150, 152, 166 can be wireless communication links, wired communication links (links that conduct or convey electrical signals, links that convey optical signals such as optical fibers, and so forth) or any combination thereof. The communications channel 136 includes a communication path provided by the wireless telecommunications service provider through the network 102 between the links 140, 148. The wireless telecommunications service provider network 102 contains example components or elements such as the data store 118, a data store 116, routers 120, 122, and servers 112, 114 to variously support functions of the network 102 that facilitate communications between elements connecting to the network 102 and/or functions of the troubleshooting processes described herein as well as various internal functions of the wireless telecommunications service provider network 102.

In example embodiments, either as an alternative or in addition to the software application 106B running on the emulator 108, the software application 106B, or an instance of it, can be run on a user device (such as the user device 162 or the user device 164) that is the same as, or substantially similar to, the user device 104, with the mobile subscriber's software application configuration and settings (as well as, for example, the same or similar operating system version and configuration as on the user device 104). As shown in FIG. 1, a user device rack host 160 connects to the Internet 128 via a link 166 and is accessible to the customer service workstation 134. The user device rack host 160 can contain multiple user devices of different make and model, such as the user devices 162, 164, for which the customer service representative might receive troubleshooting or help requests from users. The user devices 162, 164 can be loaded with software applications such as one or more of the applications 106A, 106B or instances thereof, together with appropriate configuration and settings information or configuration settings (for example, the application configuration 126, 132). Then, the software application(s) can be run on the user device within the user device rack host 160, and remotely controlled or directed, and observed, by the customer service workstation 134 via the communication links 150 and 166, the Internet 128, and the user device rack host 160. Thus, the user device rack host 160 effectively provides an emulation environment that includes an actual (rather than virtual) user device that is the same as, or substantially similar to, the user device 104. In example embodiments, the user device rack host 160 can be provided within the wireless telecommunications service provider network 102 or in any other location that is accessible to the customer service workstation 134 and enables the customer service workstation 134 to evaluate performance of the software application being troubleshot. In example embodiments, the customer service workstation 134 sends a request to the user device rack host 160 for allocation of a user device within the host 160 that is the same or comparable to the user device 104, and provided with software including the application 106B and software application configuration and settings corresponding to the user device 104 and software application 106A. The user device rack host 160 can obtain the software application 106B or an instance or copy thereof in accordance with techniques and mechanisms described herein with respect to the emulator 108 and customer service workstation 134, and can likewise receive application configuration settings/information (e.g., the application configuration 126, 132) in accordance with any of various techniques described herein, for example with respect to the customer service workstation 134 and the emulator 108, and can thus spin up or activate an appropriate user device such as the user device 162 or 164 with the specified software application to be troubleshot, operating system, and configuration and settings information or configuration settings to establish an emulation of the software application (e.g., the software application 106A or 106B) for the customer service agent to evaluate. Thus, in accordance with example embodiments, the user device rack host 160 acts as an agent of the customer service workstation 134 to provide and run an emulation environment for the software application 106B. In example embodiments, the user device rack host 160 can also provide analytic or computational resources to the customer service workstation to help the workstation 134 evaluate performance of the software application running on the user device 162, 164 in the user device rack host 160.

In various example embodiments, the mobile subscriber first requests help troubleshooting one or more software applications on the user device, by contacting a customer service provider that is either part of or under the aegis of the wireless telecommunications service provider providing or sponsoring the technical support that the mobile subscriber is requesting, or is a third-party customer service provider that is independent from the wireless telecommunications service provider. In either instance, the element of the customer service provider that directly interacts with the mobile subscriber, such as the customer service workstation 134, can be within or can be outside the wireless telecommunications service provider network 102, or can have some components or functions within the network 102, and other components or functions outside the network 102, for example, using cloud-based services for analytic and/or data storage functions that can help enhance scalability and/or performance of the customer service provider. After this dialogue has commenced, a next step is for the customer service provider to receive a copy of the settings and configuration of the software application with which the mobile subscriber needs help troubleshooting, and then run a copy of the software application in an emulator (for example the emulator 108 on the customer service workstation) or on a similar, identical, or comparable user device (e.g., the user device 162 or the user device 164 within the user device rack host 160) using the received settings and configuration information to replicate performance and behavior of the software application that the mobile subscriber is experiencing. In example embodiments, the configuration and settings information can be received with the request from the mobile subscriber. In accordance with various embodiments described herein, there are different ways for the customer service provider to obtain and receive the settings and configuration of the software application to be troubleshot.

The embodiments next described contemplate various ways and techniques for the customer service workstation 134 to receive or obtain software application configuration and settings information (or in other words, configuration settings) of the software application 106A from different locations, for example from the user device 104, from a data store inside the wireless telecommunications service provider network 102, or from another distinct source such as the third-party HTTP website 130, and then provide that information to the emulator 108 or the user device rack host 160 (or, as in some embodiments, enable the user device rack host 160 to receive the information directly from the third-party website 130, the data store 118, or the user device 104). Generally, this will involve different interactions between these four entities (the user device 104, the network 102, the customer service workstation 134, and the third-party HTTP website 130), in which different techniques are possible. For example, consider three general possibilities. First, the mobile subscriber or the user device 104 can send the software application configuration and settings information directly to the customer service workstation 134 and/or the user device rack host 160. Second, the mobile subscriber or the user device 104 can send credentials and identifying information to the customer service workstation 134 and/or the user device rack host 160, that will enable the workstation 134 and/or the user device rack host 160 to successfully request the software application configuration and settings information from a separate repository storing that information, for example the network 102 (e.g., the application configuration 126 in the data store 118) or the third-party HTTP website 130 (e.g., the application configuration 132). Third, the mobile subscriber or the user device 104 can send instructions to the separate repository (e.g., the network 102, or the third-party HTTP website 130) to send the software application configuration and settings information to the customer service workstation 134 and/or the user device rack host 160, either promptly or in response to a request from the customer service workstation 134 and/or the user device rack host 160.

In a first example embodiment, the customer service workstation 134 receives software application configuration and/or settings information for the software application 106A from the user device 104. In an example variation, the user device 104 exports the software application configuration and/or settings information to the customer service workstation 134 via the communications channel 136, which can then provide the information to the emulator 18 and/or the user device rack host 160. In another example variation, the user device 104 can provide, or can cause the wireless telecommunications service provider network 102 to provide, a one-time sign-on that the user device 104 or the network 102 can send to the customer service workstation 134 (from the user device 104 either through the communications channel 136, or through the Internet via the link 142, Wi-Fi network 124, link 144, Internet 128, and link 150, or from network 102 through either the link 148 or through the Internet 128 via the links 146, 150), that the customer service workstation 134 or the user device rack host 160 can use or activate to obtain software application configuration and settings information from the user device 104 (and optionally additional relevant information, such as user device technical specifications, specification and revision information regarding the operating system on the user device, and so forth, that form an operating environment for the software application 106A). Thus, the one-time sign-on enables access to the software application configuration and settings information. A one-time sign-on can be or include a link such as a Uniform Resource Indicator (URI) or Uniform Resource Locator (URL), and/or can include a code that when received by a data-holding entity (e.g., the user device 104) causes the entity to share configuration information corresponding to the code (e.g., software application configuration/settings information) with the bearer or presenter of the code (e.g., the customer service workstation 134), after which the code is deactivated. Additional authentication of the customer service workstation 134 can optionally be performed by the user device 104 and/or the wireless telecommunications service provider network 102 to ensure that the customer service provider or representative is authentic and authorized or approved by the wireless telecommunications service provider and/or the mobile subscriber.

In a second example embodiment, the software application configuration and settings information is stored within the wireless telecommunications service provider network 102, for example as the application configuration 126 stored in the data store 118. In example embodiments and variations thereof, the software application configuration and settings information is stored in association with the mobile subscriber's telecommunications service account, and can be stored as part of a software and data backup of the user device 104 that is pre-arranged and authorized by the mobile subscriber. Alternatively or additionally, the software application configuration and settings information can be stored separately and outside the user device 104 with the mobile subscriber's consent.

In the second example embodiment, in one variation the mobile subscriber indicates to the wireless telecommunications service provider network 102 that the customer service workstation 134 (and/or the user device rack host 160) is to be granted access to, or furnished with a copy of, the application configuration 126 stored within the network 102. The network 102 can send a copy of the application configuration 126 to the customer service workstation 134 by interjecting it into the communications channel 136 or conveying it via the link 148 between the network 102 and the customer service workstation 134. If the customer service workstation 134 is part of the network 102, the network 102 can send the software application configuration and settings information in the application configuration 126 through communication links and channels internal to the network 102. In another variation of the second example embodiment, the network 102 can generate a one-time sign-on to give to the customer service workstation 134, that it can then activate or provide to the network 102 to gain access to the application configuration 126. Thus, the one-time sign-on enables access to the software application configuration and settings information. The one-time sign-on can include a link, such as a URI or URL. In another variation, the mobile subscriber can give the customer service workstation 134 information that identifies the mobile subscriber and/or the software application that the mobile subscriber needs help with and the associated configuration and settings information, and optionally also give security information or an authentication token that the customer service workstation 134 and/or the user device rack host 160 (e.g., after communicating with the workstation 134) can present to the network 102 to identify the application configuration 126 (or enable the network 102 to identify the application configuration 126) and demonstrate authority to receive the configuration information. In an example involving public/private key security, the user device 104 uses a private key to encrypt information identifying the mobile subscriber's identity and/or account identification as well as information that identifies the user device 104 and the software application 106A, and optionally also information identifying the customer service workstation 134 or customer service representative that the mobile subscriber is working with, and then provides the encrypted information to the customer service workstation 134, which can optionally share it with the user device rack host 160. Then when the customer service workstation 134 and/or the user device rack host 160 presents the encrypted information to the network 102, the network 102 can use the mobile subscriber's public key to decrypt the information and confirm or authenticate both the mobile subscriber and the customer service workstation (and/or the user device rack host 160) as well as the mobile subscriber's intent to have the network 102 release the application configuration 126 to the customer service workstation 134 (and optionally the user device rack host 160). Other appropriate encryption and authentication techniques can alternatively be used.

In a third example embodiment, the software application configuration and settings information is stored in a location that is outside both the user device 104 and the wireless telecommunications service provider network 102, for example on the third-party HTTP website 130. In this embodiment, the customer service workstation 134 and/or the user device rack host 160 receives the application configuration 132, including software application configuration and settings information of the software application 106A, from the third-party HTTP website 130 through the Internet 128 via the links 152, 150. There are two main ways this can be initiated. In a first variation, the user device 104 (or the network 102, at the mobile subscriber's request or in accordance with pre-arranged permissions and account settings set or approved by the mobile subscriber) communicates with the third-party HTTP website 130 and conveys instructions to send the application configuration 132 to the customer service workstation 134, or to provide the application configuration 132 in response to a request from the customer service workstation 134 and/or the user device rack host 160. The communication to the third-party HTTP website 130 can include, for example, information that identifies the application configuration 132. This information can include an identification of the mobile subscriber, an account held by the mobile subscriber, and/or the user device 104 and the application 106A, where such information is variously used to index information stored on the third-party HTTP website 130. The communication can also include an identification of the customer service workstation 134 (and/or the user device rack host 160). In a second variation, the user device 104 provides identification and optionally also authentication information (for example, consistent with the private/public key security implementation described elsewhere herein, or any other appropriate authentication scheme or technique) to the customer service workstation 134, that the customer service workstation 134 can then use to make a direct request to the third-party website 130 for the application configuration 132, and/or share with the user device rack host 160 to enable the user device rack host to make the request. The identification and authentication information can comprise, for example, a one-time sign-in that the customer service workstation 134 can use once to access or receive the software application configuration and settings information from the third-party HTTP website 130.

In various embodiments, the software application configuration and settings information (e.g., for the software application 106A) are stored without personally identifying information (PII) other than an association with the mobile subscriber, e.g., a designation that the stored software application configuration and settings information pertain or belong to the mobile subscriber's user device.

In some example embodiments where the customer service workstation 134 and/or the user device rack host 160 receives or obtains the software application configuration and settings information from an entity other than the user device 104, an optional cross-check is implemented to check with the mobile subscriber and confirm authorization to release the software application configuration and settings information before the information is provided to the customer service workstation 134 and/or the user device rack host 160. This can be implemented, for example, via messaging to and from the user device 104, or any other user device known to belong to the mobile subscriber.

In some example embodiments where the software application configuration and settings information is stored on a separate entity outside the network 102 and the user device 104, the network 102 acts as proxy for the user device 104 and the mobile subscriber in accordance with standing instructions or account settings approved or set by the mobile subscriber. In this situation the network 102 monitors the communications channel 136 to discern the mobile subscriber's intent to get help troubleshooting a software application and then proactively instructs the separate entity to release the software application configuration and settings information to the customer service workstation 134 or to an agent of the customer service agent such as the user device rack host 160, or provides the customer service workstation 134 with identification and authentication information sufficient for the customer service workstation 134 to then successfully request the software application configuration and settings information from the separate entity, which it can then share with the emulator 108 and/or the user device rack host 160. The identification and authentication information can comprise, for example, a one-time sign-in that the customer service workstation 134 can use once to access or receive the software application configuration and settings information from the separate entity.

In various example embodiments, after running the application 106B in an emulation environment such as the emulator 108 on the customer service workstation 134 (or a user device in the user device rack host 160) using software application configuration and settings information of the application 106A and observing the results and optionally testing with different inputs and alternative configurations, the customer service workstation 134 can communicate results and recommendations to the mobile subscriber which in example embodiments include proposed changes to the software application configuration and settings, recommended software application or operating system versions to adopt or change to, and/or other corrective feedback. In example embodiments, one or more alternative sets of information specifying software application configuration and setting changes are provided to the mobile subscriber for adoption on the user device 104 with respect to the software application 106A, that the mobile subscriber can either manually apply, or which the user can select to have automatically adopted or applied. In example embodiments, each set of revised software application configuration and settings information can be labeled or identified and also stored along with an original set of configuration and settings information, so that the mobile subscriber can easily select and try different sets and revert to a particular set (including the original set) as desired. In example embodiments, these different sets of software application configuration and settings information are stored on the user device, within the wireless telecommunications service provider network 102 (e.g., in the data store 118), and/or in one or more separate entities such as the third-party HTTP website 130. In example embodiments, the different sets of software application configuration and settings information can be stored in conjunction with backups of the user device 104 that variously include one or more of data, software applications, and software application configurations and settings for the user device 104. In example embodiments, records of troubleshooting sessions that the customer service workstation 134 has performed for the user device 104 (e.g., for the software application 106A) can be stored in conjunction with the mobile subscriber's account information stored by the wireless telecommunications service provider administering the network 102, and in accordance with the mobile subscriber's privacy settings and terms of service agreement with the wireless telecommunications service provider. Records or results of the troubleshooting sessions can also be anonymized (e.g., by removing personally identifying information) and used by the wireless telecommunications service provider and/or the customer service provider, in accordance with permissions from the mobile subscriber, to benefit other mobile subscribers facing similar software application issues.

Figure 2:
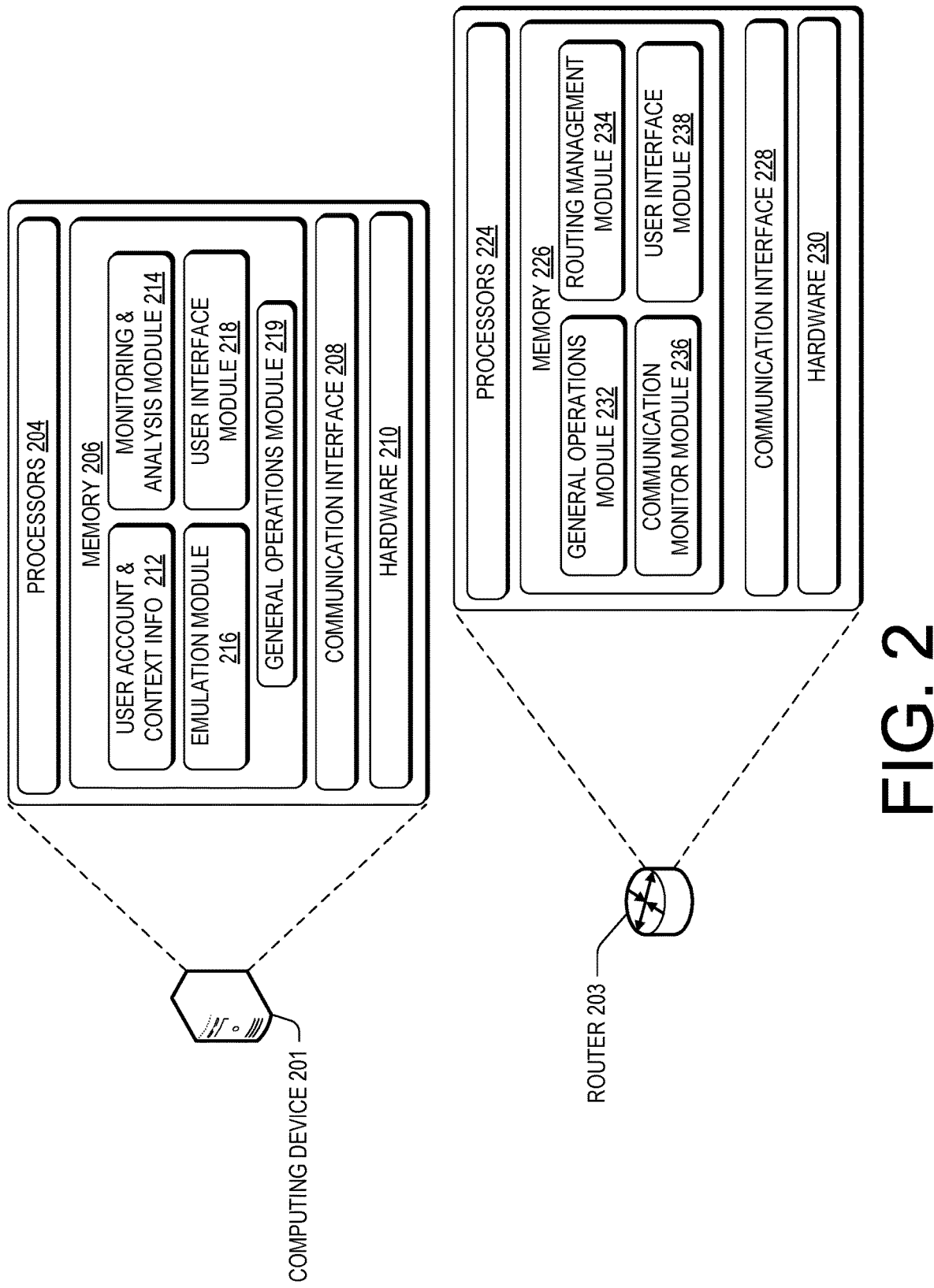
FIG. 2 shows illustrative details for various servers and other devices to implement different aspects of the architecture shown in FIG. 1.

FIG. 2 shows illustrative details of a computing device 201 and a router 203 that can support, or be variously implemented as, the system components and functions shown in FIG. 1 and/or functions described herein with respect to various embodiments and scenarios.

Figure 3:
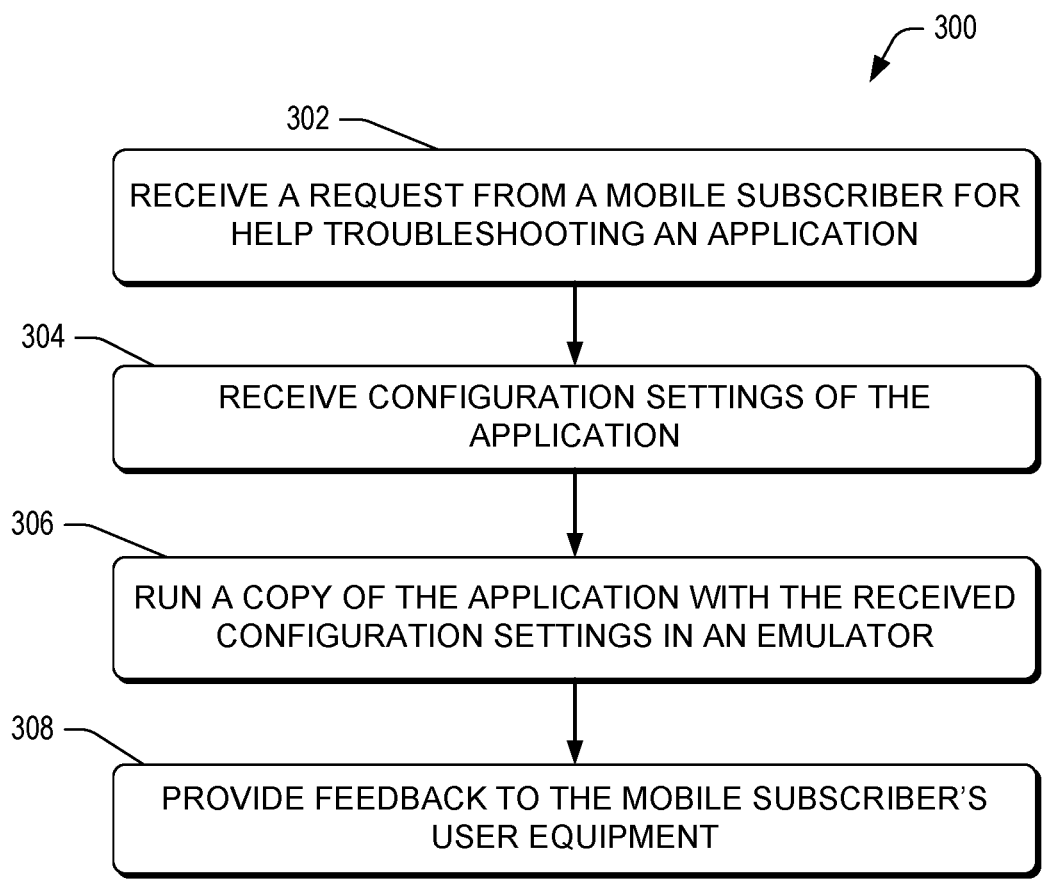
FIG. 3 is a flow diagram of an illustrative process for implementing techniques that enable entities such as customer service representatives to troubleshoot software problems encountered by mobile subscribers on their user devices.

One or more instances of the computing device 201 can, for example, form a basis for the user device 104 as well as for other equipment and functions of the wireless telecommunications service provider network 102, including for example the servers 112, 114 and the user devices 162, 164 as well as various functions described with respect to the process of FIG. 3. Instances of the computing device 201 can also support various functions within the networks 124, 128 as well as the third-party HTTP website 130 and the user device rack host 160. The computing device 201 includes processors 204, hardware 210, and a communication interface 208. The computing device 201 also has a memory 206 that includes (but is not limited to) the various software modules shown. An emulation module 216 can facilitate the emulator 108 and associated emulation environment on the customer service workstation 134, to run software applications such as the software application 106B using software application configuration and settings information such as the application configurations 126, 132. The user account information module 212 can contain information about one or more user or mobile subscriber accounts with a telecommunications service provider as well as information regarding user accounts with third party entities, from either a client perspective (e.g., information on a user device owned or controlled by the user) or from a server/service provider perspective (e.g., information about the user and their account that is resident on, or accessible to, a telecommunications service provider with whom the user has a service subscription or a third party entity providing services to the user). The monitoring and analysis module 214 can support communication monitoring and analysis functions of the servers 112, 114 and routers 120, 122 to support functions of the wireless telecommunications service provider network 102 as described herein, for example to support and monitor the communications channel 136 and other communications between entities variously shown in FIG. 1 and described herein, as well as monitoring and analysis functions in the user device 104 and the customer service workstation 134, that can implement and adjust communication functions in cooperation with the communication interface 208. The monitoring and analysis module 214 can also support emulation operations within the user device rack host 160, by configuring the user devices 162, 164 with the software application 106B and associated configurations and settings such as one or both of the application configurations 126 and 132, running the software application (e.g., the software application 106B) under direction from the customer service workstation 134, supporting control (direct or indirect) of the emulation within the user device rack host 160 by the workstation 134, and/or providing or supplementing analysis and evaluation of the emulation for use by the customer service representative/customer service workstation 134. The general operations module 219 can support different functions of various applications running on the computing device 201 including tasks delegated from other devices or services. The user interface module 218 can provide user interface functions and capability for the user device 104 and the customer service workstation 134 as well as for the servers 112, 114 and the user device rack host 160 to enable users and administrators or technicians to access and operate the user device(s), servers and associated machinery.

One or more instances of the router 203 can be variously located within and support routing functions within the wireless telecommunications service provider network 102. The router 203 includes processors 224, a communication interface 228, hardware 230, and a memory 226 that contains various software modules including a routing management module 234 that supports various routing functions of the router 203. A communication monitor module 236 can support monitoring of communications between the router 203 and other entities, for example the Wi-Fi network 124, the user device 104 and the customer service workstation 134, to support analysis and management functions performed by the servers 112, 114 or other elements of the wireless telecommunications service provider or wireless telecommunications service provider network 102 with respect to the services and communications described herein. Also included are a user interface module 238 to facilitate direct communications with a human operator if needed, and a general operations module 232 that can enable the router 203 to accept and accomplish various tasks for the system or subsystem to which it more particularly belongs.

The memories 206, 226 optionally include computer-readable storage media. Computer-readable storage media can include or encompass volatile and non-volatile, removable and non-removable media implemented in any method or technology for storage of information such as computer-readable instructions, data structures, program modules, or other data. Computer-readable storage media includes, but is not limited to, random access memory (RAM), read only memory (ROM), electrically erasable programmable read only memory (EEPROM), flash memory or other memory technology, compact disk-read only memory (CD-ROM), digital versatile disks (DVD), high-definition multimedia/data storage disks, or other optical storage, magnetic cassettes, magnetic tape, magnetic disk storage or other magnetic storage devices, or any other medium that can be used to store information for access by a computing device. As defined herein, computer-readable storage media do not consist of, and are not formed exclusively by, modulated data signals, such as a carrier wave.

FIG. 3 illustrates a process 300 that encompasses embodiments and scenarios variously described herein. In a first block 302, a request is received (for example by a customer service provider that is within or affiliated with a wireless telecommunications service provider or that is an independent third-party entity) from a mobile subscriber for help troubleshooting one or more software applications on the mobile subscriber's user device such as the user device 104. From block 302 the process moves to block 304, where the customer service provider or an agent thereof, for example a customer service representative having resources such as the customer service workstation 134, receives software application configuration and settings information for the software application(s) in question, for example the software application 106A on the user device 104.

Block 304 can include the mobile subscriber and/or the user device 104 sending the information to the customer service workstation 134 and/or the user device rack host 160. Block 304 can additionally or alternatively include the mobile subscriber and/or the user device 104 (or a proxy or agent of the mobile subscriber, for example the wireless telecommunications service provider network 102 acting on behalf of the mobile subscriber in accordance with standing instructions or prior permissions) sending identification and optionally authentication information to the customer service representative and/or the user device rack host 160, that the customer service representative and/or the host 160 can then use to access user device software application configuration and settings information that is stored outside the user device 104, for example within the network 102 or the third-party HTTP website 130, in accordance with various embodiments described herein. Block 304 can additionally or alternatively include the mobile subscriber and/or the user device 104 (or a proxy or agent of the mobile subscriber acting on behalf of the mobile subscriber in accordance with standing instructions or prior permissions, for example the wireless telecommunications service provider network 102) sending instructions to an entity storing software application configuration and settings data for the software application(s) to be troubleshot. In accordance with various embodiments described herein, the instructions direct the entity storing the software application configuration and settings data, to send that data to the customer service representative and/or the user device rack host 160, either in response to the instructions or after the entity receives a request from the customer service representative and/or the rack host 160 for the information. From block 304 the process moves to block 306.

In block 306 the customer service representative runs or causes running of an instance of the software application to be troubleshot on or in a virtual user device or emulation environment, for example the emulator 108 on the customer service workstation 134, or on a user device such as the user devices 162, 164 in the user device rack host 160, configured with the software application configuration settings received in block 304 to test and evaluate the software application in accordance with various embodiments described herein. From block 306, the process moves to block 308.

In block 308, feedback regarding the emulation is provided, for example to the mobile subscriber's user device 104. The feedback can include a performance report of issues found or confirmed as well as corrective feedback such as recommended changes to the software application configuration and settings, in accordance with example embodiments described herein.

All or some of the operations and functions variously described herein with respect to example embodiments and scenarios and the process shown in FIG. 3 can be variously re-ordered, performed sequentially or in parallel, combined, or iteratively repeated. For example, different sets of configuration and settings information can be received and evaluated, or subsets of the configuration and settings information can be separately or iteratively evaluated, by iteratively repeating blocks 304, 306 before performing block 308. In another example embodiment, feedback can be provided as the emulation progresses, so that blocks 306, 308 are performed simultaneously. In another example embodiment, the block sequence shown in FIG. 3 can be repeated for the same mobile subscriber with respect to different software applications on the mobile subscriber's user device, either iteratively or simultaneously/in parallel for the different software applications.

Various embodiments provide technical advantages that enable greater service and functionality to be provided to users with greater efficiency and lower resource cost. For example, evaluating performance of a mobile subscriber's user device software application using an instance of the application in an emulator or emulation environment using configuration settings from the user device enables effective troubleshooting assistance to be provided without exposing the user's data or requiring resource-intensive communications that are necessary when a remotely-located customer service representative directly controls and observes operations on the mobile subscriber's user device, thus conserving system and network resources while providing effective and satisfying customer service experiences for mobile subscriber customers. Emulation or simulation results can also be efficiently stored and used to help the mobile subscriber with future, possibly recurring problems as well as other mobile subscriber customers encountering similar user device software application problems, thus further conserving telecommunications network and customer service provider resources.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for troubleshooting a performance of an application on a first user device, comprising:
   receiving a request for help troubleshooting the application;
   receiving configuration settings of the application;
   instantiating, using the received configuration settings, a copy of the application within an emulation environment that comprises a virtual representation of the first user device;
   running the copy of the application with the received configuration settings within the emulation environment; and
   providing feedback to the first user device based on the running.

2. The method of claim 1, wherein:
   receiving configuration settings comprises receiving a one-time sign-on that when activated, enables access to the configuration settings of the application; and
   the configuration settings reflect settings on the first user device.

3. The method of claim 1, wherein the virtual representation of the first user device comprises software running within the emulation environment that mimics a same make and model as the first user device.

4. The method of claim 1, further comprising:
   presenting credentials to a third party that a) identify a backup of the first user device that includes the configuration settings of the application and that is stored by the third party and b) confirm authority to access the backup; and
   wherein receiving configuration settings of the application comprises receiving the configuration settings of the application from the third party in response to the presenting.

5. The method of claim 1, wherein:
   the request comprises an identification of an account with a wireless telecommunications service provider for the first user device; and
   receiving configuration settings of the application comprises accessing, based on the identification, a copy of the configuration settings of the application that is stored by the wireless telecommunications service provider.

6. The method of claim 1, wherein:
   running the copy of the application with the received configuration within the emulation environment comprises executing a performance of the application on the virtual representation of the first user device using the configuration settings and without using data from the first user device that belongs to a mobile subscriber other than the configuration settings.

7. A network device, comprising:
   at least one processor;
   a network interface;
   a storage device coupled to at least one processor; and
   software instructions stored in the storage device, wherein execution of the software instructions by the at least one processor configures the network device to perform:
   receiving a request for help troubleshooting an application on a first user device;

receiving configuration settings of the application;
instantiating, using the received configuration settings, a copy of the application within an emulation environment that comprises a virtual representation of the first user device;
running the copy of the application with the received configuration settings within the emulation environment; and
providing feedback to the first user device based on the running.

8. The network device of claim 7, wherein:
receiving configuration settings comprises receiving a one-time sign-on that when activated, enables access to the configuration settings of the application; and
the configuration settings reflect settings on the first user device.

9. The network device of claim 7, wherein the virtual representation of the first user device comprises software running within the emulation environment that mimics a same make and model as the first user device.

10. The network device of claim 7, further comprising:
presenting credentials to a third party that a) identify a backup of the first user device that includes the configuration settings of the application and that is stored by the third party and b) confirm authority to access the backup; and
wherein receiving configuration settings of the application comprises receiving the configuration settings of the application from the third party in response to the presenting.

11. The network device of claim 7, wherein:
the request comprises an identification of a mobile subscriber's account with a wireless telecommunications service provider; and
receiving configuration settings of the application comprises accessing, based on the identification, a copy of the configuration settings of the application that is stored by the wireless telecommunications service provider.

12. The network device of claim 7, wherein:
running the copy of the application with the received configuration within the emulation environment comprises executing a performance of the application on the virtual representation of the first user device using the configuration settings and without using data from the first user device that belongs to a mobile subscriber other than the configuration settings.

13. A computer readable storage medium comprising instructions that, when executed by at least one processor, cause the at least one processor to perform:
receiving a request for help troubleshooting an application on a first user device;
receiving configuration settings of the application;
instantiating, using the received configuration settings, a copy of the application within an emulation environment that comprises a virtual representation of the first user device;
running the copy of the application with the received configuration settings within the emulation environment; and
providing feedback to the first user device based on the running.

14. The computer readable storage medium of claim 13, wherein:
receiving configuration settings comprises receiving a one-time sign-on that when activated, enables access to the configuration settings of the application; and
the configuration settings reflect settings on the first user device.

15. The computer readable storage medium of claim 13, wherein the virtual representation of the first user device comprises software running within the emulation environment that mimics a same make and model as the first user device.

16. The computer readable storage medium of claim 13, further comprising instructions that, when executed by the at least one processor, cause the at least one processor to perform presenting credentials to a third party that a) identify a backup of the first user device that includes the configuration settings of the application and that is stored by the third party and b) confirm authority to access the backup; and
wherein receiving configuration settings of the application comprises receiving the configuration settings of the application from the third party in response to the presenting.

17. The computer readable storage medium of claim 13, wherein:
the request comprises an identification of a mobile subscriber's account with a wireless telecommunications service provider; and
receiving configuration settings of the application comprises accessing, based on the identification, a copy of the configuration settings of the application that is stored by the wireless telecommunications service provider.

18. The computer readable storage medium of claim 13, wherein:
running the copy of the application with the received configuration within the emulation environment comprises executing a performance of the application on the virtual representation of the first user device using the configuration settings and without using data from the first user device that belongs to a mobile subscriber other than the configuration settings.

* * * * *